(12) United States Patent
Carroll

(10) Patent No.: US 10,556,681 B2
(45) Date of Patent: *Feb. 11, 2020

(54) ROTARY DEVICE WITH INTEGRATED POWER STORAGE

(71) Applicant: David W. Carroll, Grantsburg, WI (US)

(72) Inventor: David W. Carroll, Grantsburg, WI (US)

(*) Notice: Subject to any disclaimer, the term of this patent is extended or adjusted under 35 U.S.C. 154(b) by 257 days.

This patent is subject to a terminal disclaimer.

(21) Appl. No.: 15/451,750

(22) Filed: Mar. 7, 2017

(65) Prior Publication Data

US 2017/0320571 A1    Nov. 9, 2017

Related U.S. Application Data

(63) Continuation of application No. 14/632,106, filed on Feb. 26, 2015, now Pat. No. 9,586,684.

(60) Provisional application No. 61/945,614, filed on Feb. 27, 2014.

(51) Int. Cl.
| | |
|---|---|
| *B64C 39/02* | (2006.01) |
| *B64D 35/02* | (2006.01) |
| *B64C 11/20* | (2006.01) |
| *B64D 27/24* | (2006.01) |

(52) U.S. Cl.
CPC ........... *B64C 39/024* (2013.01); *B64C 11/20* (2013.01); *B64D 27/24* (2013.01); *B64D 35/02* (2013.01); *B64C 2201/042* (2013.01); *B64C 2201/108* (2013.01); *Y02T 50/44* (2013.01); *Y02T 50/62* (2013.01)

(58) Field of Classification Search
CPC ....... B64C 39/024; B64C 11/20; B64C 27/24; B64C 35/02; B64C 2201/042; B64C 2201/108
USPC ........................................................ 244/53 R
See application file for complete search history.

(56) References Cited

U.S. PATENT DOCUMENTS

| | | | |
|---|---|---|---|
| 3,533,187 A | 10/1970 | Campbell | |
| 3,640,492 A * | 2/1972 | Star ....................... | B64D 45/00 244/124 |
| 3,937,424 A * | 2/1976 | Meier .................... | B64D 27/24 244/53 R |
| 5,297,759 A | 3/1994 | Tilbor et al. | |
| 8,954,206 B2 * | 2/2015 | Criado .................. | G05D 1/105 701/4 |
| 9,679,490 B2 * | 6/2017 | Ceribelli .............. | G05D 1/0005 |
| 2007/0206342 A1 | 9/2007 | Tipton et al. | |
| 2010/0147993 A1 | 6/2010 | Annati et al. | |
| 2011/0093139 A1 | 4/2011 | Arms et al. | |
| 2012/0234969 A1 | 9/2012 | Savoye et al. | |
| 2013/0285440 A1 | 10/2013 | Pan et al. | |

OTHER PUBLICATIONS

Kevin Bullis, "Redefining Battery Operated," MIT Technology Review, Jul. 1, 2006.

* cited by examiner

*Primary Examiner* — Marc Burgess
(74) *Attorney, Agent, or Firm* — Dicke, Billig & Czaja, PLLC

(57) ABSTRACT

A rotational power device including a blade having a core formed by battery material as a power source.

20 Claims, 7 Drawing Sheets

ROTARY DEVICE WITH INTEGRATED POWER STORAGE

CROSS REFERENCE TO RELATED APPLICATIONS

This application is a Continuation of U.S. application Ser. No. 14/632,106, filed Feb. 26, 2015, entitled "ROTARY PROPELLER DRONE WITH INTEGRATED POWER STORAGE," which claims the benefit of the filing date of U.S. Provisional Patent Application Ser. No. 61/945,614, filed Feb. 27, 2014, entitled "ROTARY PROPELLER DRONE WITH INTEGRATED POWER STORAGE," the entire teachings of which are herein incorporated by reference.

BACKGROUND

The present disclosure relates to drones or unmanned aircraft systems (UAS). More particularly, it relates to rotary propeller drones with integrated or on board power storage, for example integrated into the propeller.

UASs or drones are remotely piloted or self-piloted aircraft that can carry various items, such as cameras, sensors, communications equipment, etc. Drones can vary greatly in terms of size and complexity. More recently, small and even miniature sized drones have been devised. Regardless of size, drones generally include a propulsion system, a power source for powering the propulsion system, a steering mechanism, a controller including a remote communication system, and a frame maintaining all other components.

For a very small drone to be functional, all components are desirably lightweight. While the propulsion systems can vary, for lightweight applications, a helicopter or rotary propeller system is conventionally employed. The propeller itself is driven or rotated by an electric motor. In some instances, a conventional single or mono-rotor provides adequate lift. However, to reduce an overall footprint of the drone while increasing lift (and steering), other small-sized drones include multiple propellers or rotors, each with its own dedicated electric motor (or other power generator), such as banana-type twin-rotors, counter-rotating coaxial rotors, quadcopter or quadrotors (four fixed-pitch rotors), etc. One example of a miniature drone incorporating the quadcopter design is the "Crazyflie" nano quadcopter available from Bitcraze AB.

While existing small or miniature sized drones have been well received and continue to evolve, the over-riding requirement for very lightweight components has rendered these drones to be viewed as toys. While hobbyists no doubt enjoy assembling and flying the small aircraft, the drones cannot achieve appreciable flying heights and cannot stay airborne for an extended length of time. A primary design constraint giving rise to these limitations is the size and/or weight of the power source powering the motor. With very small drones, battery-powered electric motors are typically employed. The battery occupies a substantial area (relative to a size of the drone as a whole), and is relatively heavy. If a smaller and/or lighter battery is utilized, the flying time and available altitudes are even further reduced.

In light of the above, a need exists for improved power storage devices useful, for example, with rotatory propeller drones and other rotary devices.

DETAILED DESCRIPTION

Figure 1:
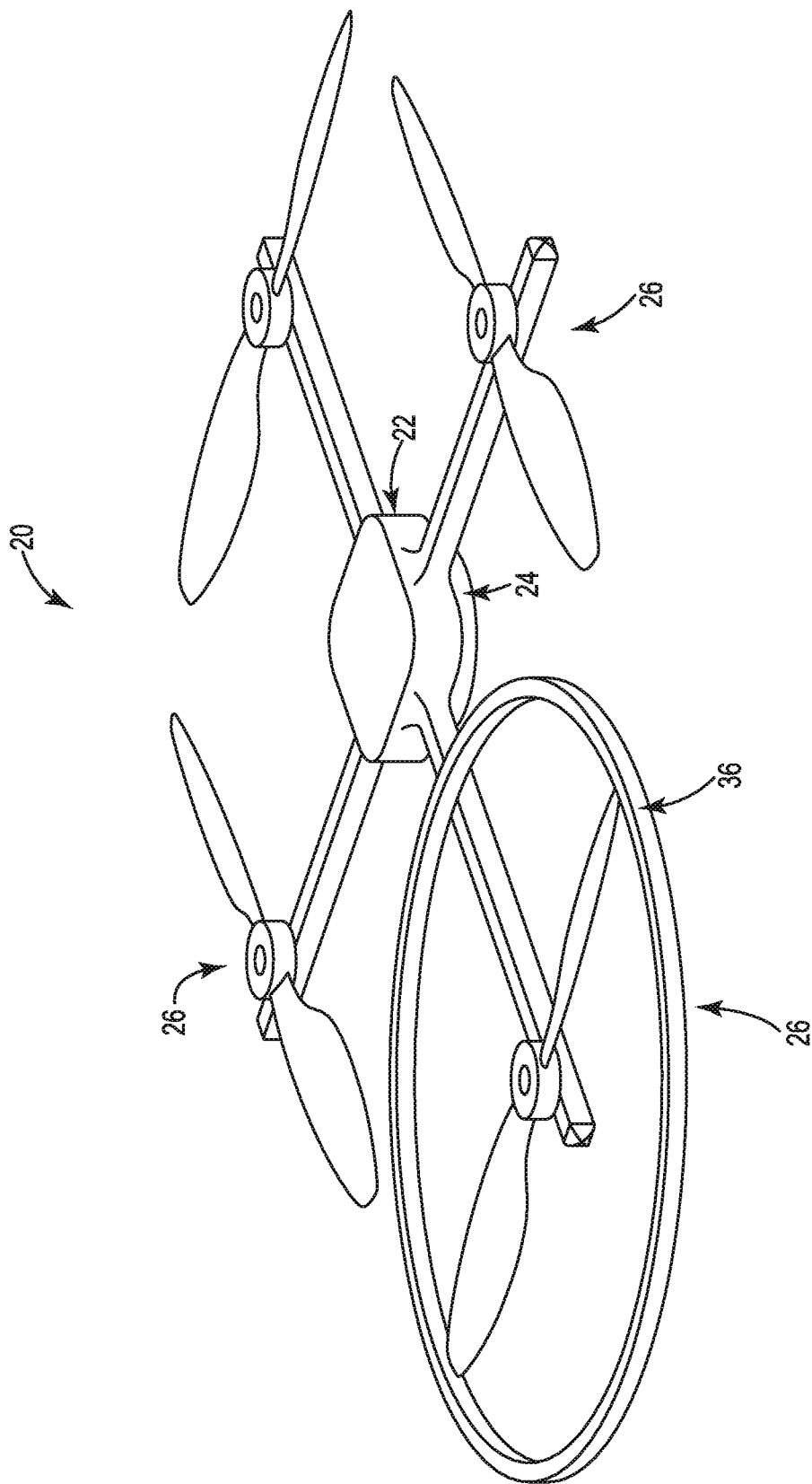
FIG. 1 is a perspective view of an unmanned aircraft system or drone in accordance with principles of the present disclosure.

One embodiment of a drone 20 incorporating an integrated power source in accordance with principles of the present disclosure is shown in FIG. 1. The drone 20 can assume a wide variety of forms, and generally includes a base 22, a controller 24, and one or more powered propeller assemblies 26. With the exemplary embodiment of FIG. 1, the drone 20 includes four of the powered propeller assemblies 26 (e.g., the drone 20 is akin to a quadcopter), but in other embodiments, a greater or lesser number is provided (e.g., a single powered propeller assembly, dual propeller assemblies, etc.). Regardless, the controller 24 is carried by the base 22, and includes electronics (e.g., memory, transreceiver, etc.) programmed to effectuate remote control by a user over operation of the powered propeller assemblies (e.g., the controller 24 can include a small circuit board with various electronic chips programmed to perform computer-like operations, such as the SD card-sized computer development board available under the trade name "Edison" from Intel Corp. of Santa Clara, Calif.). The base 22 is formed of a light weight material (e.g., plastic, fiberboard, etc.) and provides sufficient surface area for maintaining the controller 24 as well as other optional components (not shown), such as LEDs, sensors, cameras, etc. Further, the base 22 interconnects the powered propeller assemblies.

Figure 2:
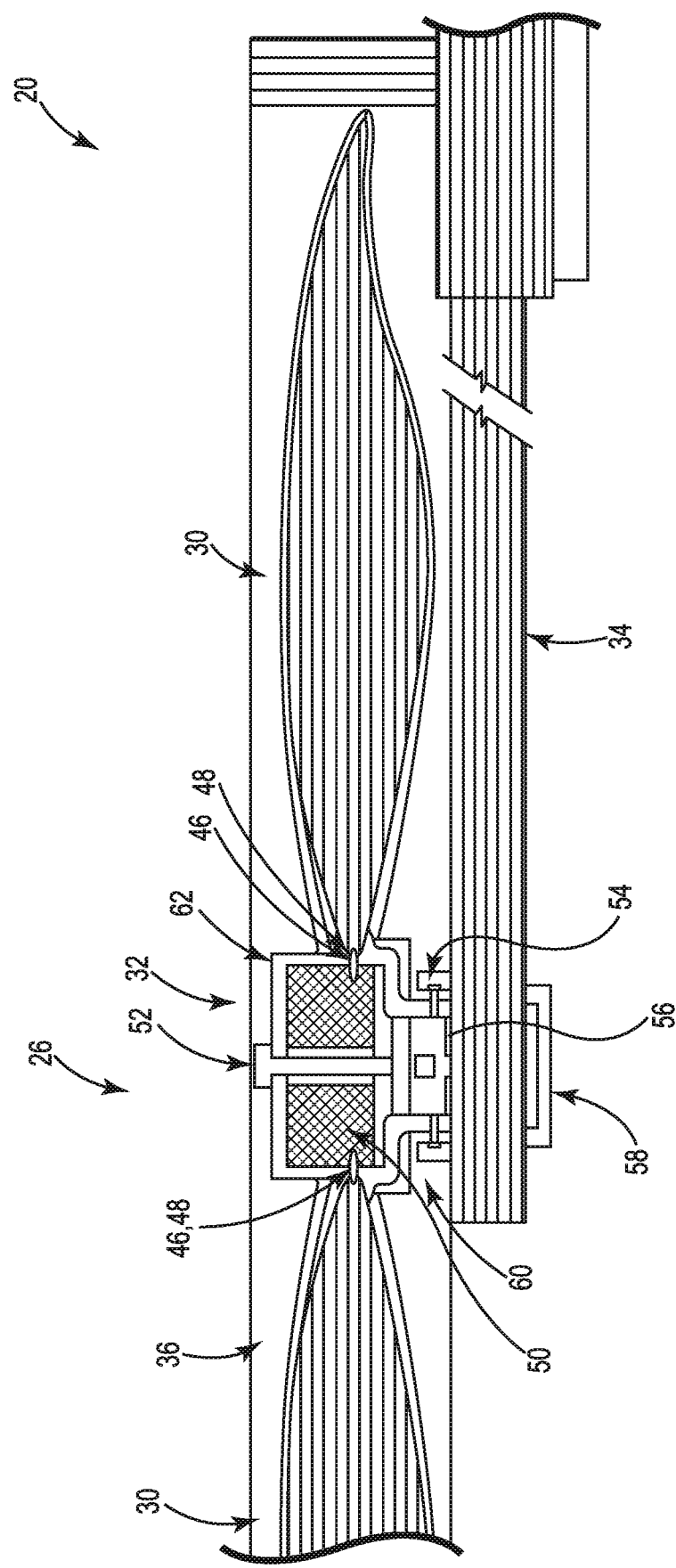
FIG. 2 is a cross-sectional view of a portion of the drone of FIG. 1, and illustrated a powered propeller assembly.

Each of the powered propeller assemblies 26 can be identical. FIG. 2 illustrates one of the assemblies 26 in greater detail. The assembly 26 includes one or more propeller wings 30, an electric motor 32, a strut 34, and an optional safety ring 36 (best illustrated in FIG. 1). In general terms, the propellers 30 are assembled to the motor 32, with the electric motor 32 operating to rotate the propeller wings 30. The strut 34 maintains the electric motor 32 relative to the base 22. Where provided, the safety ring 36 surrounds the propeller wings 30 to prevent accidental contact therewith by a user's hand when rotating or other individuals when flying. As described in greater detail below, the electric motor 32 is powered by a power source that is integrated into the propeller wing(s) 30 in some embodiments, and in other embodiments into the strut 34 and/or the base 22.

Figure 3:
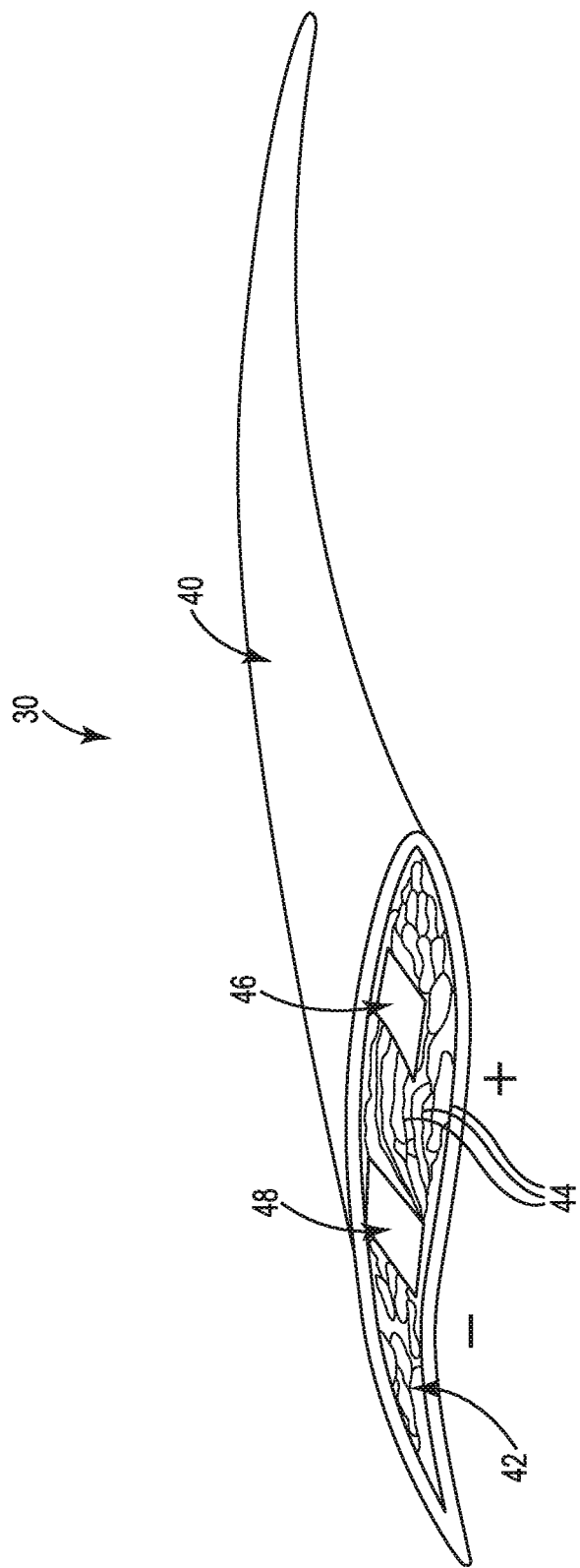
FIG. 3 is a cross-section of a propeller wing component of the powered propeller assembly of FIG. 3.
Figure 4A:
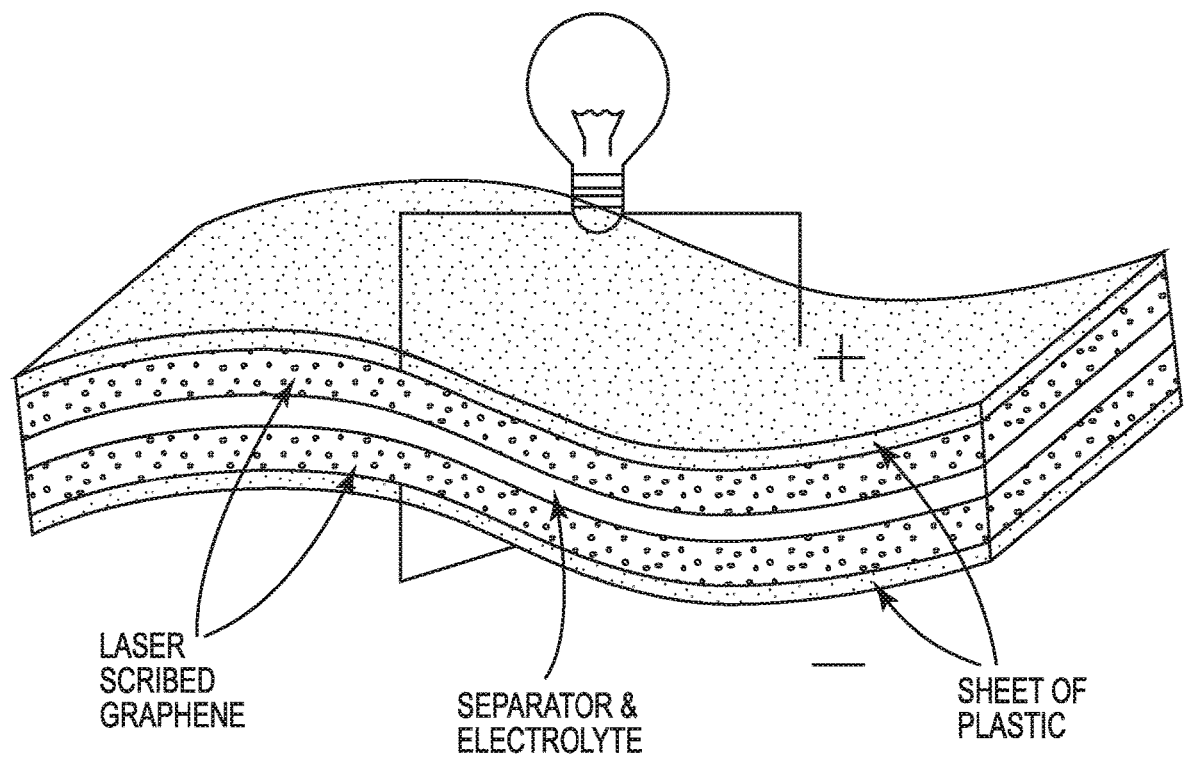
FIGS. 4A and 4B illustrate graphene super capacitor constructions useful with the devices of the present disclosure.
Figure 4B:
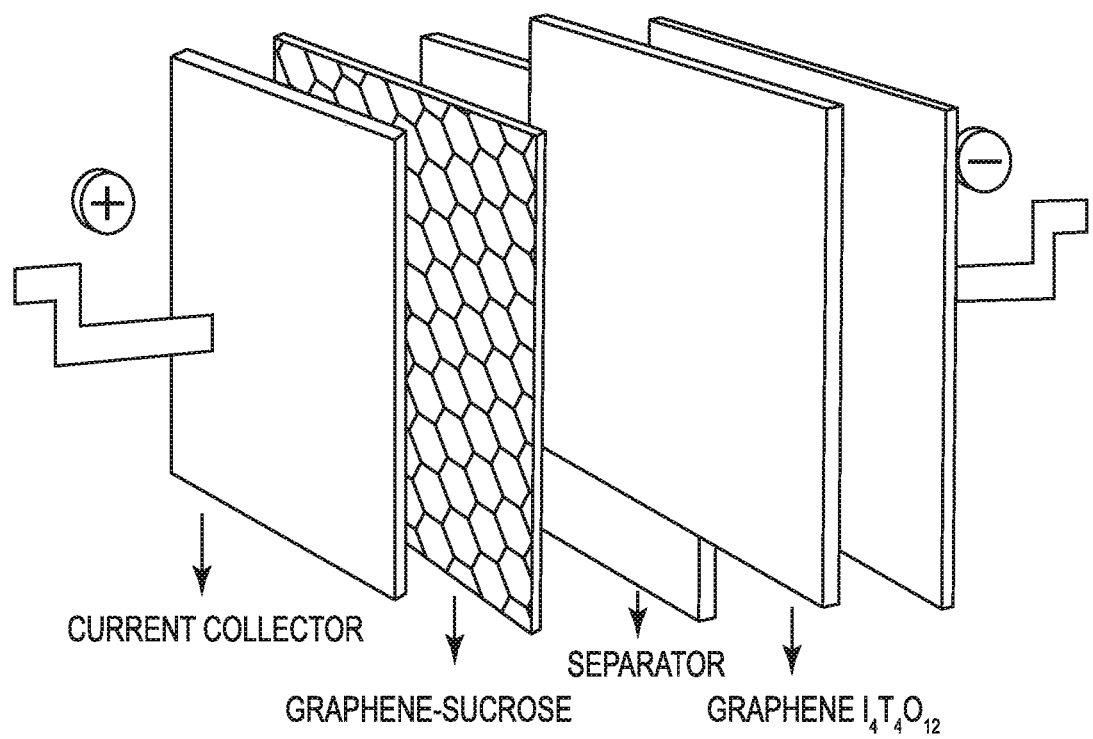

For example, FIG. 3 illustrates one embodiment of the propeller wing 30 configured to provide or serve as an integrated power source for the electric motor 32 (FIG. 2). The propeller wing 30 includes a cover 40 and a core 42. The cover 40 defines an external shape of the propeller wing 30 that can be any shape and size conducive to providing aerial lift when rotated. The core 42 is maintained within the cover 40 and includes one or multiple layers of a battery material 44 (referenced generally). In some embodiments, the battery material layer(s) 44 are a graphene-based super capacitor developed by Monash University of Melbourne, Australia. A graphene ($Li_4Ti_3O_{12}$) super capacitor is composed of very thin layers that create a compact electrode from an adaptive graphene gel film. To control the spacing between the graphene sheets on a sub-nanometer scale, liquid electrolytes are used. Unlike conventional super capacitors that are generally made of highly porous carbon with unnecessarily large pores and rely on a liquid electrolyte to transport the electrical charge, the liquid electrolyte in the graphene-base super capacitor plays a dual role of conducting electricity and also maintaining the minute space between the graphene sheets. This maximizes the density without compromising the super capacitor's porosity. Examples of a graphene-based super capacitor are shown in FIGS. 4A and 4B. In other embodiments, the battery material layers 44 are a nanopore-based battery structure. A nanopore battery structure generally comprises tiny holes in a ceramic sheet (or other material such as anodic aluminum oxide) that hold electrolyte to carry the electrical charge between nanotube electrodes at either end. Many millions of these nanopores can be formed into a larger battery structure the size of a postage stamp.

Returning to FIG. 3, tabs 46, 48 can protrude from the battery material layers 44, and serve as positive and neutral (−) conductive collective terminals. An optional graphene super capacitor layer or other battery in layer form (not shown) can cover and connect the material layers 44. An optional intermediary layer of polyimide or similar material can provide additional circuitry or laminating strength to the propeller wing(s) 30. Regardless, the tabs 46, 48 join the two (−/+) divisions of the battery material layers 44 and provide contact for use of the power from the graphene super capacitor or other battery type both in and out. The tabs 46, 48 take space usually at the end of the power package and therefore are appropriate at the motor or shaft-mounting end of the propeller wing 30. In some embodiments, the tabs 46, 48 are conjoined and more directly integrated into the magnetic field and thereby reduce the mass of the propeller wing 30 in the flying or stationary device's motor and/or generator. For example, the positive tab 46 and the neutral tab 48 are spaced and shaped to directly create the magnetic field. This provides power to a central pivot and/or integrated motor or generator system. It is envisioned that the tabs 46, 48 can be integrated into one or more flex circuits to more efficiently orient the power from the stacked from of the battery material layers 44 in the propeller wing 30 to the winding at the electric motor 32 (FIG. 2) and/or generator.

As more power is now available from the battery material layers 44 of the propeller wing 30 (e.g., graphene-based super capacitors and nanopore battery structures hold more power in a lighter and smaller area as compared to conventional super capacitor batteries or most other battery formats), other packaging methods and contacts can be employed. For example, in some embodiments a flex circuit on the edge of the battery material layers 44 can be used to more readily, thinly and at low weigh gather the power from each of the many material layers 44. This can be applied using mini-flex stubs, pins or extensions from vias mounted to the flex or from the battery material layers. Each layer then makes contact to mini-pads or directly to separate circuits for each +/− purpose. Flex can be cut to create tabs that can be inserted between the layers of the battery material layers 44 during the lamination process. Optionally a two-layer flex with dielectric can make both +/− sides in one inserted tab. All the layers are now in one flex and can be circuited internally to bring all or selected numbers of the layers to be used as power and as directed by switching. This reduces weight, combines power or selects power as desired for specific purposes as directed. It expands the applications by providing easier to physically deliver power in various configurations. For example a propeller or propeller wing with integrated battery material layers will be made to follow the linear plane of the wing and with the flex be able to better connect that power in or out with the power generating or using mechanics for the wing's motion mechanism. It is contemplated that the flexible connection system may be along the length of the wing vs. at the connection end of the wing. The flex circuit may be integrated with the structural enclosure or shell portion of the propeller wing 30. The flex may be the entire wing shell. It may be the enclosure of the battery material layers 44. It may be both the propeller shell and the battery material layers 44 enclosure. The fold over form can facilitate the creation of the necessary cross-sectional shape for an airfoil of a propeller wing.

Returning to FIG. 2, the electric motor 32 can be of a conventional type and includes a motor winding 50, an armature 52, an electrical connection 54, an armature mount 56, and an attachment device 58. The armature mount 56 retains the armature 52 relative to the motor winding 50. The electrical connection 54 is opposite the motor winding 50, and can be connecting to the armature 52 by an optional housing 60. The propeller wings 30 are mounted to a cap 62 that is otherwise caused to rotate by the electric motor 32. Further, the tabs 46, 48 (referenced generally) of the propeller wings 30 are electrically connected to the motor winding 50. Finally, the attachment device 58 can assume a wide variety of forms, and is configured for mounting the electric motor 32 to the strut 34. With this construction, the electric motor 32 operates to rotate the propeller wings 30, with the battery material layer construction of, for example, one or both of the propeller wings 30 providing requisite power to the electric motor 32. In related embodiments, power from the integrated power source propeller wing(s) 30 is further delivered to the controller 24 by circuitry (not shown) extending along or through the strut 34. Other powered components (not shown) provided with the drone 20 (e.g. LEDs) can also be powered by the integrated power source. It is contemplated that one or more of the powered components can be mounted internally or externally on the propeller circuitry.

Figure 5A:
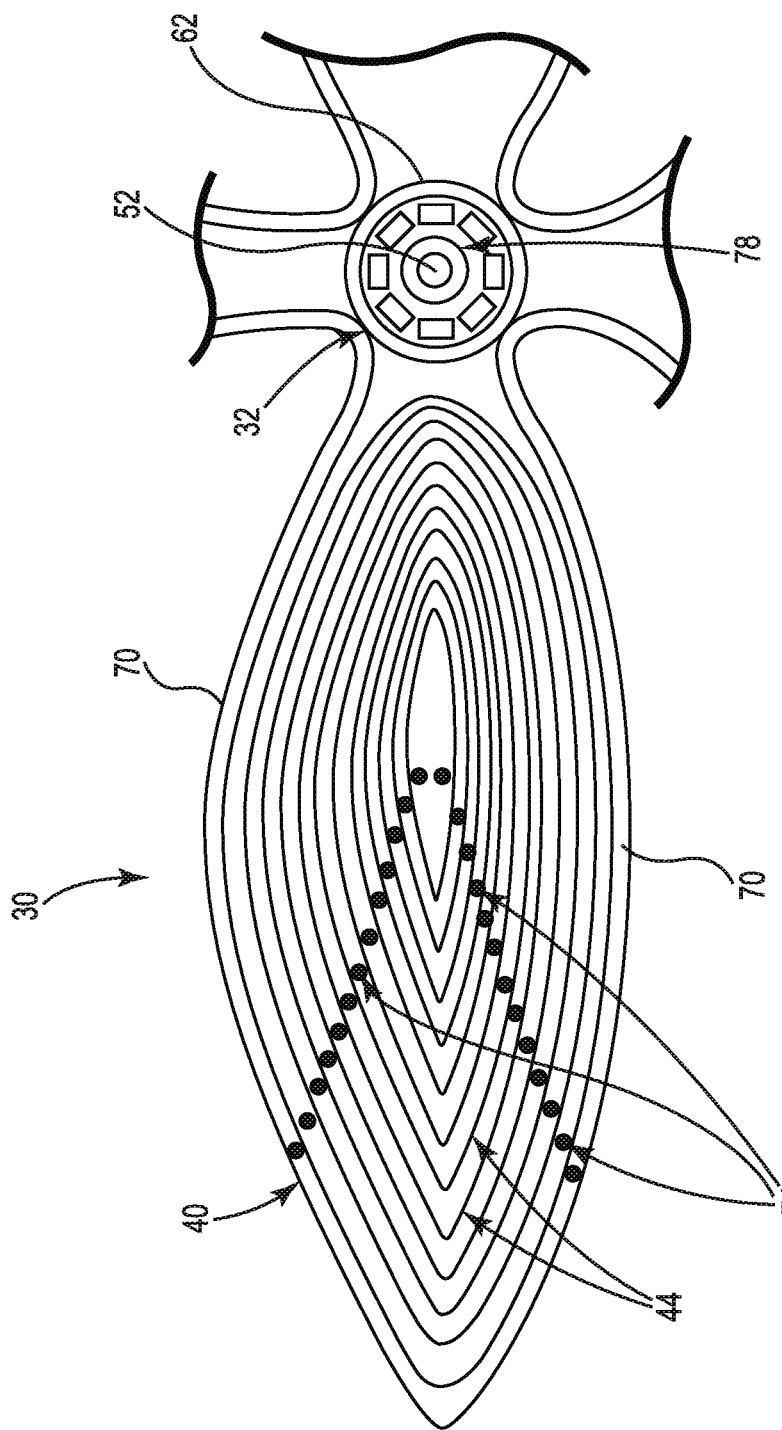
FIG. 5A is a longitudinal cross-sectional view of a propeller wing and portions of other components of the drone of FIG. 1.
Figure 5B:
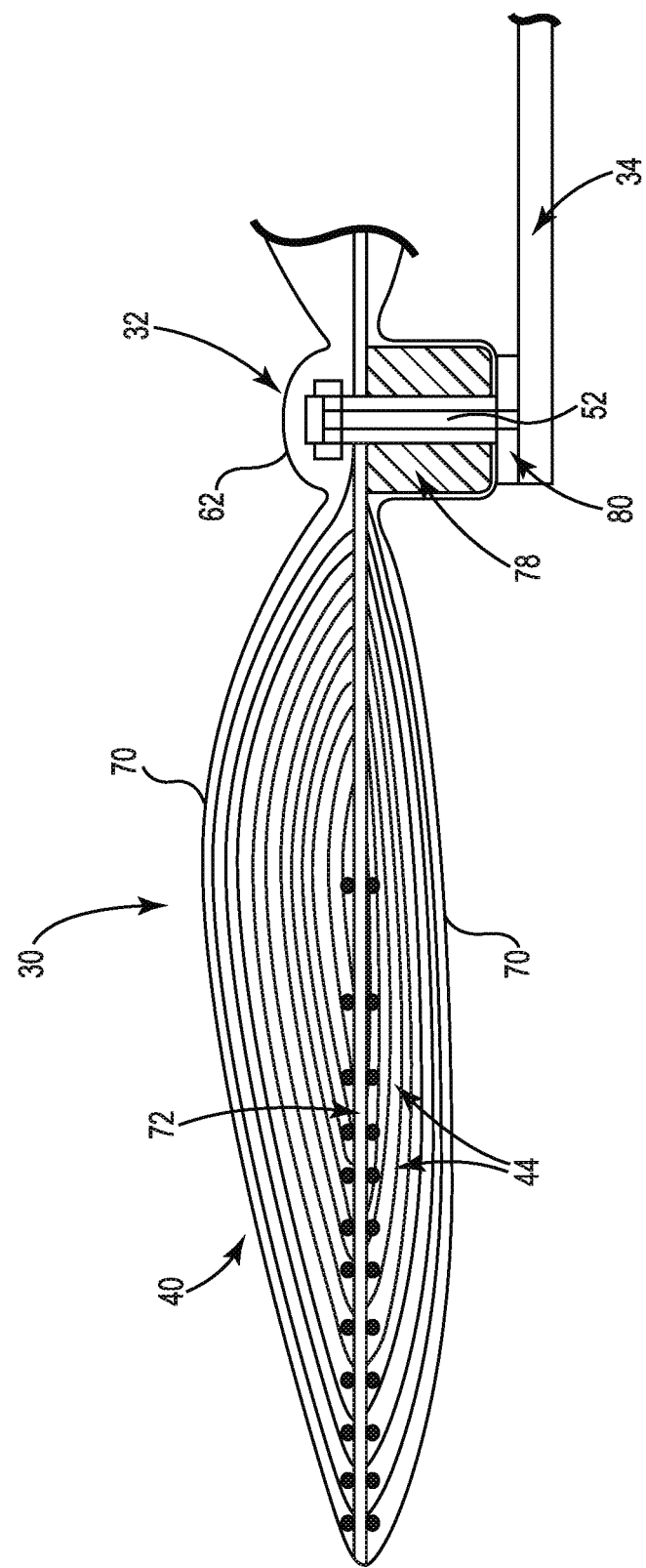
FIG. 5B is a transverse cross-sectional view of the propeller wing of FIG. 5A.

In some embodiments, and with reference to FIGS. 5A and 5B, a polyimide flexible circuit 70 (or similar material) is used as the case 40 and provide a power circuitry path for the propeller's internal battery material layers 44. The polyimide circuit 70 (often referred to as a flex circuit) or similar material can be formed into a shape appropriate for serving as a propeller wing. Because the polyimide circuitry 70 usually contains a copper or other electrically conductive layer it can be thicker or thinner to help create the desired strength. One may choose to have a more forgiving form. Before, during or after the flex circuit sheet is die stamped for the outline shape it can also be formed to the propeller wing 30 three-dimensional shape. Doing so makes it more rigid. Also, using this material as the casing and conduction makes the propeller wing 30 uniquely multi-purposed, durable while simplifying propeller production.

In one optional version, a flat internal mid-layer 72 can be used in conjunction with a top case layer and a bottom case layer. This creates a stronger sandwich form.

Optionally, the propeller case 40 can be made from polycarbonate or other common drone propeller plastic and molded with the battery material layers 44 as inserted during the molding process. In this process, it is contemplated one may use only a strip of flex circuitry as required to access the multiple layers 44 of thin format battery types.

The curved cross section of mostly flat-layered propeller battery laminations permits access to many layer exposed edges for flexible substrate connection (e.g., identified at 74 in FIG. 5A). Graphene super capacitors have a large number of power layers with separating dielectric layers. The flex circuit layer 70 can be used in the way shown in FIG. 5A or a number of other configurations that permit a smart power controller 76 to use part, all or some of the power from a layer at a time, a select number of layers together sufficient to meet power requirements of the motor 32. Likewise, nanopore batteries can be layered and connected and used in a similar fashion described in the graphene super capacitor example.

In the method of manufacturing a propeller where polyimide sheets 70 are used as the case 40, one assembly method may be to use the outer edge of conductive material exposed so in soldering the battery material layers 44 become sealed. This also maintains the shape of the propeller wing 30 and strengthens the shape. It creates more durable leading and trailing propeller wing edges.

In the method of construction where the flat material sandwiched into the propeller wing 30 is determined to be required or more cost effective, the sheet of polyimide or rigid sheet material, with or without a circuit, can be sandwiched into the middle 72 of the battery material layers 44. If this is used as a conductive substrate then it can be made from lower cost FR4 or common green fiberboard. If the circuitry for conducting power to the motor 32 is done with the enclosure 40 top, bottom or both, then one can further strengthen the propeller wing 30 using a high durometer rubber or polycarbonate.

It is contemplated the center core of the battery material layers 44 may be composed only of the battery material layers 44.

In any of the above uses of a polyimide circuit as the core 72 or the case 70 it is contemplated the material may be formed at the motor 32 such that it can be an insert into a core of the motor 32 on its own be formed to create a field 78 of the motor 32 (e.g., within the cap 62 that is otherwise supported by bearings 80 relative to the strut 34 or other framework component) directly or with an additional component or components. These may be magnets, coils or metallic shapes. The forming may be a combination of all propeller wings on that motor shaft encompassing the armature 52 to provide the power for the motor's field 78.

Where the case 40 is made from or just internal to a clear plastic enclosure case it is contemplated the circuit can contain LEDs to light the propeller wing 30 in general. LEDs may be lit or placed selectively to create a desired message, shape, symbol or color effect from a program or non-time setting.

The above-described integrated power source provided with the propeller wing(s) 30 is one exemplary embodiment in accordance with principles of the present disclosure. In other embodiments, one or more of the base 22 (FIG. 1) and the strut 34 can include a core formed of the graphene-based super capacitor or nanopore battery materials described above. In related embodiments, the propeller wing(s) 30 have a conventional design, and an entirety of the integrated, battery material layer power supply resides in the base 22, the strut 34 and/or other components of the drone 20.

Returning to FIG. 1, the drones of the present disclosure (such as the drone 20) can be utilized and deployed to perform a wide variety of tasks otherwise requiring relatively high altitudes and/or relatively long flight times. By way of but one example envisioned by the present disclosure, oil or gas wells are quite tall and are at risk to the release of methane, and other pollutants at the well's head. Aerial long distance data of 6000 wells has shown methane leakage at levels two times the impact of $CO_2$ from coal. Moreover, it has been estimated that 20% of the approximately 500,000 oil and gas wells across the United States account for approximately 70% of the total methane leakage. It is virtually impossible, though, to know whether a particular well has significant methane leakage without obtaining data at the wellhead during operation. Drones of the present disclosure can carry necessary sensors and/or cameras and can be flown over the wellhead to obtain necessary data.

In general terms, aspects of the present disclosure use one or more battery material layers (e.g., graphene super capacitors or nanopore batteries) within or optionally as the propeller's structural shape. The battery material layers encasement effectively becomes the propeller's operational surface in one version of the invention. There is capacity for making lightweight and strong shapes like a propeller with graphite layers. This is efficient and supportive use of space by integrating the capacitor's stored power.

One application for use of such shape and application specific integrated power storage is to provide power for the motor that drives the bladed propulsion/rotation for the locomotion of an air vehicle. This includes the growing applications for propeller-based drones.

One advantage of the present disclosure is evidenced by multifunctional use of materials. It is the mass in the shape required for flight and stores power. This is especially important on a flying device, since it is very weight sensitive. When applied on a very small quad drone it is possible the majority of the vehicle's volume is the four propellers.

Besides providing power for the movement of the propeller, further applications of the integrated propeller power are contemplated. This includes power for warning LED lights and could be built into, onto or nearby the propeller or associated vehicle connective structure. Propeller mounted LED lights can be sequenced to provide a message that forms when the propeller is turning or stationary as programmed for that condition or status.

Besides drone propeller power applications a similar system can be applied in wind generator propellers. This application can use the integrated power advantage for mini-wind generation devices to large wind turbine generation systems. The onboard power can initiate or orient movement of the propellers so wind can more readily be accessed in lighter wind conditions or to readily face changing wind orientations. It can also be used to power sign or alert LEDs. This can make for larger and a more ideal asset for advertising and other display space rentals.

Whether for a drone, a helicopter or a tower based wind generator, the internal propeller power application may be used for such further applications as bird audio alert system, land- or sea-based wind generator power supply balancing, air motion and speed detection systems, propeller feathering or rotation orientation systems, wireless radio, powered antenna systems, light message relay beacons, on-board processing for smart/decision making systems, braking systems or propeller noise cancelling devices.

It is contemplated that the propeller's integrated power can work to or through a generator or motor's magnetic field. This way the propeller's power storage system can work in concert with power sources or power requirements located elsewhere. This is also true for processing control governance in either direction of shared systems processing at either side of the motor. Controlling through a motor is typical to industrial robotics motors and sensor systems.

Data through moving motor parts typical to robot methods to direct or govern the propeller. The propeller may or may not require or benefit from on-flex control versus remotely governed control through the motor. It is contemplated the motor can be mounted affixed to the propeller to either the rotor or stator sides. This could be used for a drone as shown in the drawings but applied in the various ways described for typical applications or methods known using mobile or stationary electronic supported activities on propeller wind-based devices and aircraft including drones.

This integrated power storage and supply within a propeller used in a wind power generation device can provide local and emergency power for quick load and unload blade speed characteristics as required to safely operate using blade angle modification and or orientation. Further, blades facing to changing winds or to pre-power the propeller spin in advance of coming wind or wind direction changes can be made based on knowledge provided by upwind sensors. The later application permits a wind generator to work beginning at lower wind speeds. It can also be used to make adjustments to propeller speeds to help in gusts or wind direction momentary challenges based on onboard sensors.

In aircraft, the propeller located power can be used for emergency landing should the craft otherwise lose power. The power can be used to initiate the destruction of onboard secure data in the event of capture or crashing in an unsecure area. The power might be used to help locate parts of the craft or the craft itself.

One of the major benefits is that this power source in this location can be made useful as the propeller core. Small multiple blade devices and systems where weight and propeller blade volume ratios are high in comparison to the rest of the device or system make this modified propeller with integrated battery material layers (e.g., graphene super capacitor or nanopore battery) a unique asset for intermittent power use and storage. It can be used in helicopter tail propellers to maintain craft orientation when the normal drive system fails or has been disrupted by enemy fire. It can be used to propel a main propeller motion for an emergency landing in ultralight aircraft or paragliders. It can be used to power diversion or anti-recognition devices.

The invention can be used in a unique combination of the above. For example a drone or wind generator with pre-powering for anticipated wind could be constructed such that it operates independently by intermittently gathering wind power for charging said system and using that power for propelling the device. This can be done in conjunction with motor-generators, permanent magnet motors or other known motor and generator methods. To accomplish this in a drone the craft positions itself to gather power as a wind generator by fixed stationing with orientation to use available wind to gather and store power in the propeller with an embedded or integrated battery material layers (e.g., graphene super capacitor(s) or nanopore battery). For example a mini-quadcopter (e.g., palm sized) uses its propellers to store power at such locations and uses that power to alight and fly when sufficient power has been gathered. In this fashion the drone can be independent from any power source and operate for extended mission purposes.

It is contemplated that any flying or stationary device may integrate the propeller-stored power with one or more power sources located in other areas of a device. This in combination may provide power continuously or intermittently for applications such as cell phones, toys and cameras. It might be released for flight by a user to become a cell phone relay in remote areas. It is contemplated that these empowering wings can be mobile or fixed and sized to meet the needs of the application. Typical to the aforementioned use of flex directly to the motor it can be applied directly to the power requirements of the device. For example a propeller can integrate into the motor mounting area a cell phone or the cell phone can be mounted to the battery material layers within or immediately adjacent to the propeller.

The integrated battery material layers (e.g., graphene super capacitor or nanopore battery) into a propeller can be used to pulse power in various systems and methods. This is accomplished by the use of sub-segments of the battery material layers.

The development of graphene super capacitors and nanopore batteries permits multiples more power in the same amount of volume/area at a lower weight. This means there is value in independent sections of resident energy used as directed by a custom application. For example it is contemplated the flex circuitry described earlier is made to permit power use in computer controlled switched segments. The multiple flex contacts are compactly placed and can drain and or fill these segments in sequence. Because they can now be used in a more deliberate and controlled fashion the normal burst operation of a capacitor or common emission of power from a layered nanopore battery can be used as desired. It is contemplated the flex may use various standard means for integrating the switches on the flex. In review, super capacitors collect and dispense power most often in a quick fashion. Processor controlled segmented flex switches permit these bursts of power in smaller amounts to meet the requirements of more applications using a flex circuit's many segment zones with integrated or adjacent switching for any determined or manufactured amounts of the graphene super capacitor. In the case of a nanopore battery, segmented batteries can be more fully used in supplying the voltage required by using the layers and returning to combine otherwise unusable power to meet the voltage. This switching may be done wirelessly, or by a flex enclosure and in circuit and in or on propeller components.

Drones are required to be compact and light to fly further on less power. One premise of the present disclosure is that propellers are proportionately a large part of a drone, especially in a mini-drone. They can remain relatively lightweight even when used as a power source because graphene super capacitor (for example) holds approximately 10× more power per weight than non-graphene super capacitors and are composed of light material. Nanopore batteries are similarly advantageous.

It is also contemplated the power source can be integrated into the struts that hold propellers in a quad drone, and can share the motor powering responsibilities with power from the propeller(s).

The propeller's unique location for power and being close to powering mechanics for motor and generator systems is ideal to reduce components and mechanics for holding and delivering power. It is therefore contemplated that the electric motor may be directly attached to or mounted on the propeller's axis.

There is a growing value in this use of active propulsion surface area as drones are shrinking. Integrating power storage into the required and moving flight surfaces is inventive and an important percentage of available placement for the new advantages of a graphene super capacitor or nanopore battery. In this way the power is closest to the drive or generation system.

Aspects of the present disclosure in early applications work especially well with very small or mirco-drones (palm sized or less for example) but will prove to be of value for larger forms as well. In some short flight, close operations with multiple drones it works well as groups accomplish applications rotationally. The speedy repowering of each of the power types of the present disclosure can be advantageous, providing a format that makes it easier to keep at least one craft in position doing a continuation activity by exchanging tasks often.

The new Intel SD card sized micro-PC can provide a smart and wireless on-board processing system to perform more independent operations using on-board programs. Such gains in size are quickly lost to the requirement for required battery size and weight. The integration of the power to the propeller and other components is of value to over-all flying capability.

Graphene super capacitors are laminated devices, and with the optional enclosure of polyimide (or similar material) can be structured and formed as a propeller or propeller wing. Similarly, a nanopore battery comprises millions of tiny battery structures in just a postage stamp-sized form; when stacked in a laminated format and contained and connected by an enclosure (e.g., polyimide circuitry) can also be formed as a propeller or propeller wing. This lamination aids the linear structure of the propeller and can be manufactured to help create and hold the desired shape of the propeller in linear and airfoil cross-section shapes.

The electrical field created in the motor or generator can move power through the field in either direction to share power from other sources to make the spinning motion. It is contemplated the arms extending out to hold multiple propeller locations apart from each other and conjoined for flying can also be made of the battery material layers of the present disclosure (e.g., graphene super capacitor or nanopore batteries manufactured on a poly sheet, cut to shape, and folded to 3D form). The drone body likewise can have an integrated graphene super capacitor. The power from the propellers can support the motion or other powered operations from either direction.

It is contemplated that a drone with power stored in the propellers can charge by making contact to a power source using a connector, surface contact for charging or swap mostly power used or drained propellers for charged ones. Power can be loaded at a station or in the air from a charging flying device since power is loaded so quickly into a graphene super capacitor or nanopore battery. It can do so while hovering at the time of charging because the power can be circuited to power the blade while in motion through the magnetic field. An example of a stationary ground based power system is for drones to load power from a tall whip like tower. Multiple stations on the end of such a tower permit multiple mini-drones to charge at the same time. Hordes of mini-drones can come and go like bees to a flower but do so to charge based on software and/or sensors. This group drone charging uses criteria for sequential use based on power remaining on each drone. Likewise drones can use camera images or other sensors to detect charging location availability. A central charging point can provide many drone charging stations in a relatively small area.

A mini-drone propeller that is in motion with the weight of the battery material layers of the present disclosure (e.g., graphene super capacitor or nanopore battery) can be kept at a desired average speed with intermittent power. Pulsed use of the graphene super capacitors herein described and located in the propeller can perform this task by the previously described switching means.

Optionally the propeller integrated battery material layer (e.g., graphene super capacitor or nanopore battery) can drive an air pump to provide a lower friction propeller mechanics for an air-ride bearing. In other embodiments, the propeller or one or more of the propeller wings can be configured to be manually or automatically collapsible or expandable.

Although the devices of the present disclosure have been described with reference to preferred embodiments, workers skilled in the art will recognize that changes can be made in form and detail without departing from the spirit and scope of the present disclosure.

What is claimed is:

1. A rotary device, comprising:
a frame;
a rotational power mechanism supported by the frame; and
a blade including a core of battery material as a source of power for the rotational power mechanism;
wherein the rotational power mechanism is linked to the blade such that the blade can rotate relative to the frame via the rotational power mechanism.

2. The rotary device of claim 1, wherein the rotational power mechanism is a motor.

3. The rotary device of claim 1, wherein the rotational power mechanism is a generator.

4. The rotary device of claim 1, wherein the rotary device is a flying device.

5. The rotary device of claim 4, wherein the flying device is a drone.

6. The rotary device of claim 4, wherein the flying device is selected from the group consisting of a helicopter, an ultralight aircraft and a paraglider.

7. The rotary device of claim 1, wherein the rotary device is a wind power generator.

8. The rotary device of claim 1, further comprising:
an auxiliary electrical device supported by the frame apart from the rotational power mechanism; and
wherein the core of battery material is electrically coupled to the auxiliary electrical device such that the core of battery material provides a power source for the auxiliary electrical device.

9. The rotary device of claim 8, wherein the auxiliary electrical device is an LED.

10. The rotary device of claim 8, wherein the auxiliary electrical device is carried by the blade.

11. The rotary device of claim 10, wherein the auxiliary electrical device is configured to provide wireless communication.

12. The rotary device of claim 1, wherein the battery material is selected from the group consisting of a graphene super capacitor and a nanopore battery.

13. The rotary device of claim 1, wherein the core of battery material comprises a plurality of battery material layers.

14. The rotary device of claim 1, wherein the blade is a component of a propeller that is integrated into the rotational power mechanism.

15. The rotary device of claim 1, wherein a first portion of the rotational power mechanism is attached to the blade and a second portion of the rotational power mechanism is attached to the frame.

16. The rotary device of claim 1, further comprising a power source apart from the blade and electrically connected to the rotational power mechanism as a second source of power for the rotational power mechanism.

17. The rotary device of claim 1, wherein the blade further includes an enclosure that encases the core.

18. The rotary device of claim 1, further comprising a flex circuit electrically connected to the core.

19. The rotary device of claim 18, wherein the core of battery material includes a plurality of battery material layers, and further wherein the flex circuit includes circuitry traces to electrically connect to at least two of the battery material layers.

20. The rotary device of claim 19, further comprising a controller programmed to selectively open and close electrical connection between selective ones of the battery material layers and the flex circuit.

* * * * *